United States Patent
Nakamizo et al.

(10) Patent No.: US 8,382,380 B2
(45) Date of Patent: Feb. 26, 2013

(54) TAPERED ROLLER BEARING

(75) Inventors: Eiichi Nakamizo, Kuwana (JP); Junichi Hattori, Kuwana (JP); Hideshi Nishiwaki, Kuwana (JP); Tatsuya Omoto, Kuwana (JP); Michio Hori, Kuwana (JP)

(73) Assignee: NTN Corporation, Osaka (JP)

( * ) Notice: Subject to any disclaimer, the term of this patent is extended or adjusted under 35 U.S.C. 154(b) by 1127 days.

(21) Appl. No.: 11/508,139

(22) Filed: Aug. 23, 2006

(65) Prior Publication Data

US 2007/0047865 A1    Mar. 1, 2007

(30) Foreign Application Priority Data

Aug. 25, 2005 (JP) ................ 2005-244791
Oct. 7, 2005 (JP) ................ 2005-294932

(51) Int. Cl.
*F16C 33/46* (2006.01)
(52) U.S. Cl. ......... 384/571; 384/564; 384/572; 384/584
(58) Field of Classification Search .............. 384/571, 384/572, 564, 565, 584
See application file for complete search history.

(56) References Cited

U.S. PATENT DOCUMENTS

| | | | |
|---|---|---|---|
| 2,071,628 A * | 2/1937 | Hedgcock | 384/571 |
| 3,477,773 A | 11/1969 | Alton | |
| 4,288,129 A | 9/1981 | Ryanen | |
| 7,175,351 B2 * | 2/2007 | Ono et al. | 384/571 |

FOREIGN PATENT DOCUMENTS

| | | |
|---|---|---|
| DE | 27 39 367 | 10/1978 |
| DE | 35 24 063 | * 1/1987 |
| DE | 42 07 329 | 10/1992 |
| EP | 0 980 985 | 2/2000 |
| FR | 2 600 131 | 12/1987 |
| GB | 817744 | 8/1959 |
| JP | 59-050224 | 3/1984 |
| JP | 10-176718 | 6/1998 |
| JP | 11-247847 | 9/1999 |
| JP | 2000-065049 | 3/2000 |
| JP | 2001-140900 | 5/2001 |
| JP | 2001-208054 | 8/2001 |
| JP | 2003-287033 | 10/2003 |

(Continued)

OTHER PUBLICATIONS

European Search Report issued Nov. 27, 2008 in EP 06 01 7065.

(Continued)

*Primary Examiner* — William C Joyce
(74) *Attorney, Agent, or Firm* — Wenderoth, Lind & Ponack, L.L.P.

(57) ABSTRACT

Tapered rollers are retained between outer and inner rings by a retainer to be circumferentially spaced apart from each other. The inner ring has a raceway on its outer surface and includes small and large-diameter flanges at the small- and large-diameter ends of the raceway, respectively. The retainer includes two annular portions and crossbars extending between the annular portions. Its radially inner surface is located radially inwardly of the pitch cone of the tapered rollers to increase the thickness of the crossbars and the axial thickness of the small-diameter annular portion. The conical surface defined by the outer surfaces of the crossbars has an inclination angle that is greater than the central angle of the bearing to increase the volume of the crossbars. The rigidity of the retainer is thus increased.

1 Claim, 10 Drawing Sheets

FOREIGN PATENT DOCUMENTS

| JP | 2005-106070 | 4/2005 |
|----|-------------|--------|
| WO | 81/02918 | 10/1981 |

OTHER PUBLICATIONS

Notice of Reasons for Rejection issued Apr. 27, 2010 in JP 2006-213034 (with partial English translation).

Japanese Notice of Reasons for Rejection (and partial English translation thereof) issued on Aug. 17, 2010 in Japanese Patent Application No. 2006-213034.

Communication from European Patent Office issued Sep. 5, 2011 regarding Notice of Opposition in corresponding European Application No. 06 017 065.1.

"Wälzlager: Bauarten, Eigenschaften, neue Entwicklungen"; Joachim Ackermann, Verlag Moderne Industrie, Landsberg/Lech, 1990, pp. 26 to 28.

"Wälzlager auf den Wegen des technischen Fortschritts"; Hrsg. FAG Kugelfischer Georg Schäfer KGaA, Schweinfurt; Oldenbourg, München/Wien, 1986, 2. Auflage, pp. 115-119.

"Modern Wälzlagertechnik", Ioannides u.a., Vogel, Würzburg, 1991, pp. 215-272.

* cited by examiner

Fig.13

TAPERED ROLLER BEARING

BACKGROUND OF THE INVENTION

This invention relates to a tapered roller bearing for use in rotating portions of automobiles, railcars, machines for manufacturing steel, machine tools, and particularly construction machines.

Figure 7:
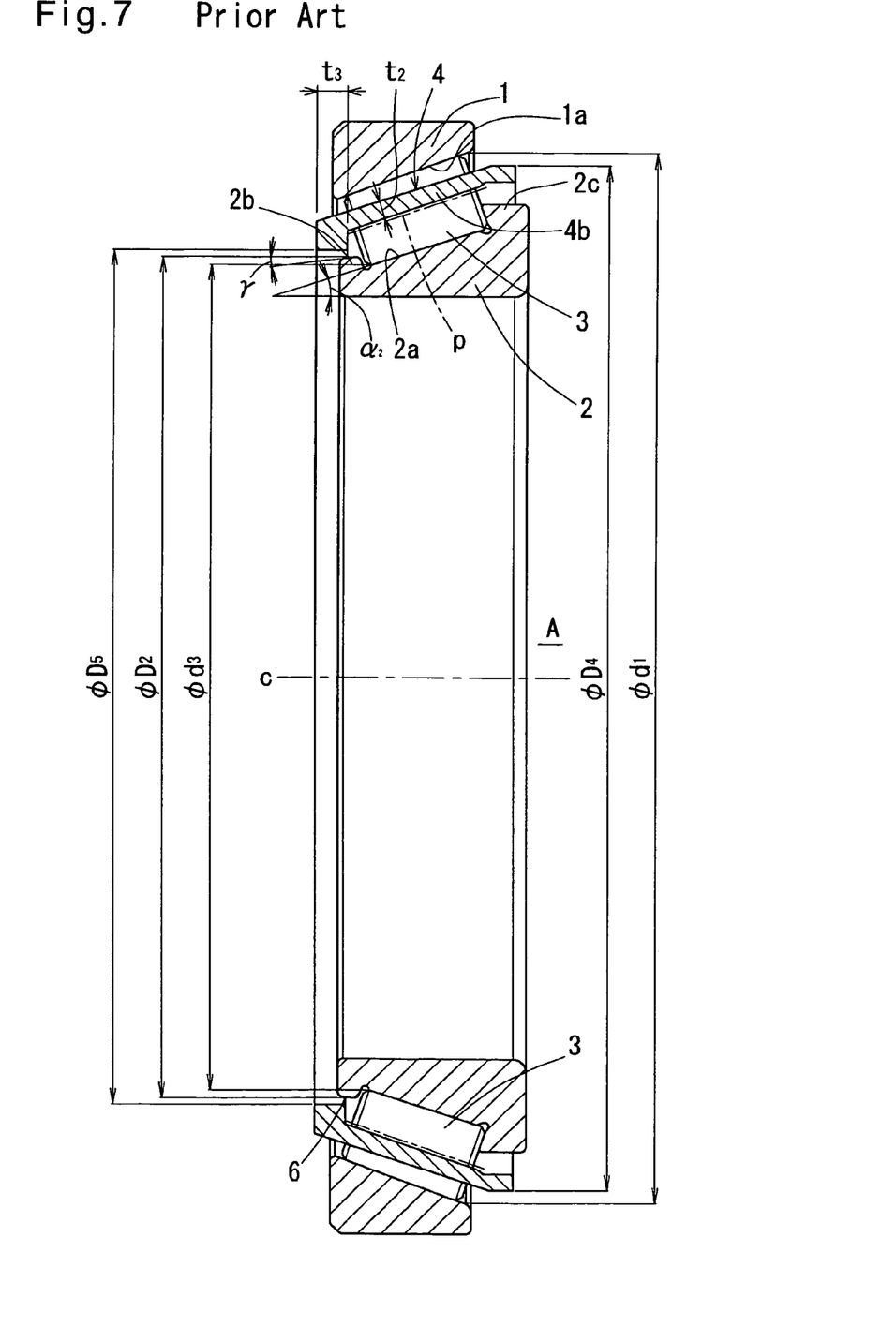
FIG. 7 is a sectional view of a conventional tapered roller bearing.
Figure 13:
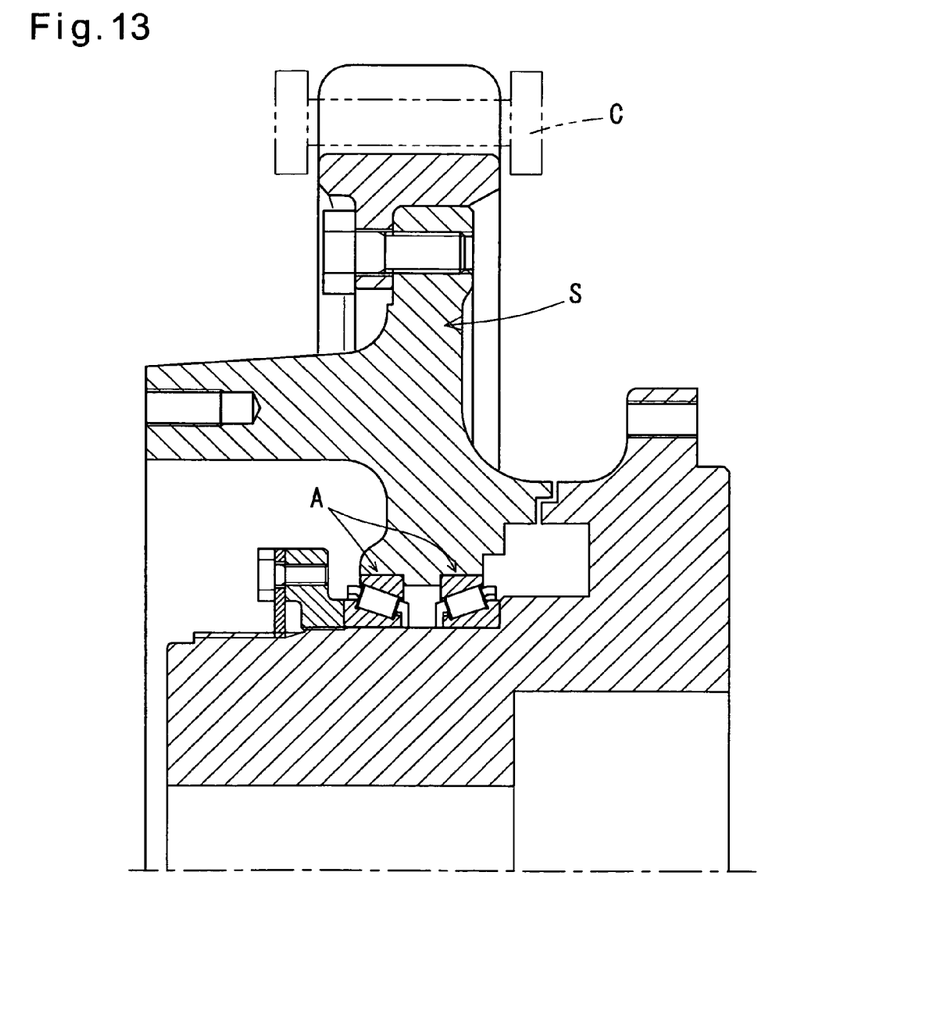
FIG. 13 is a partial schematic sectional view of a travel reducing sprocket of a hydraulic excavator.

FIG. 13 shows tapered roller bearings A used in a rotating portion of a hydraulic excavator as a construction machine. More specifically, the tapered roller bearings A are mounted in a travel speed reducing sprocket S of the hydraulic excavator around which a crawler C is trained. As shown in FIG. 7, such a tapered roller bearing A comprises an outer ring 1, an inner ring 2, a plurality of tapered rollers 3 mounted between the outer and inner rings 1 and 2, and an annular retainer 4 made of synthetic resin and retaining the tapered rollers 3 so as to be circumferentially spaced apart from each other. The inner ring 2 is formed with a raceway 2a and includes a small-diameter flange 2b at the small-diameter end of the raceway 2a and a large-diameter flange 2c at the large-diameter end of the raceway 2a. Such a tapered roller bearing is disclosed in JP patent publication JP 2003-287033A.

Figure 8A:
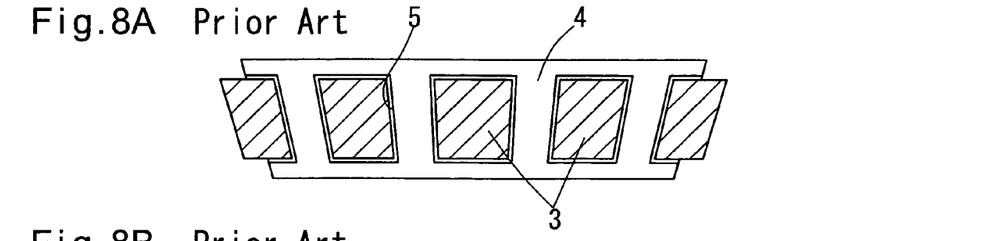
FIGS. 8A to 8D and FIGS. 9A to 9C show how a tapered roller bearing is assembled.
Figure 8B:
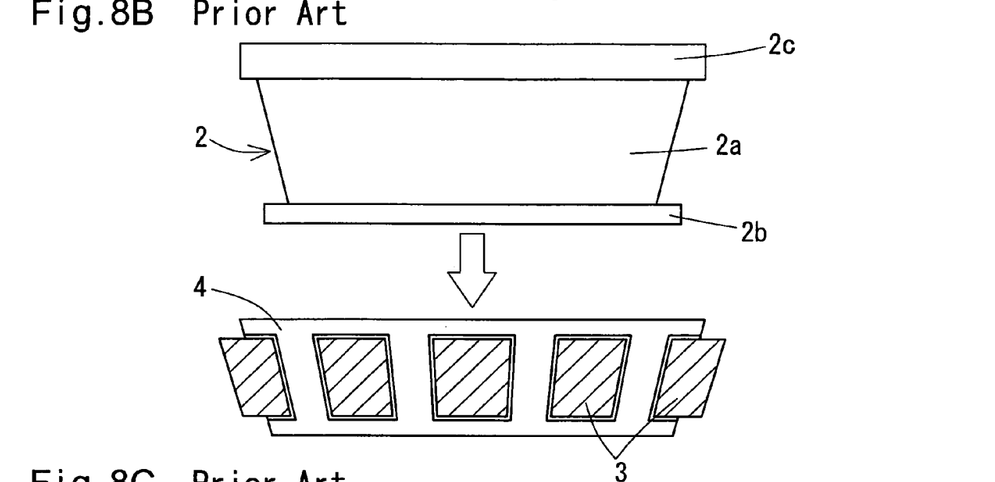
Figure 8C:
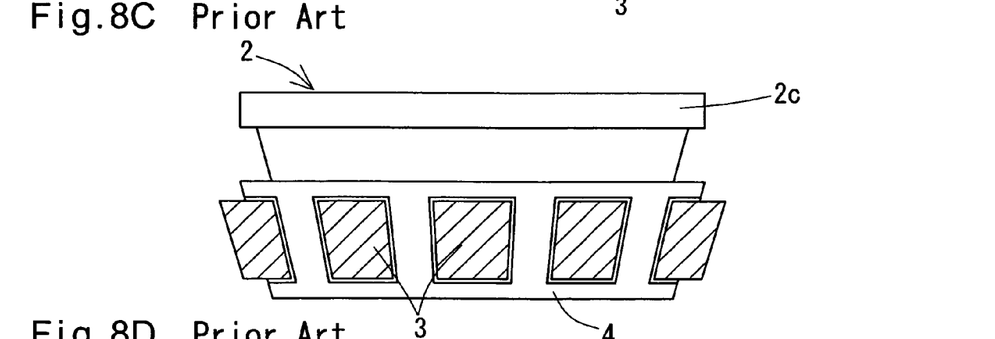
Figure 8D:
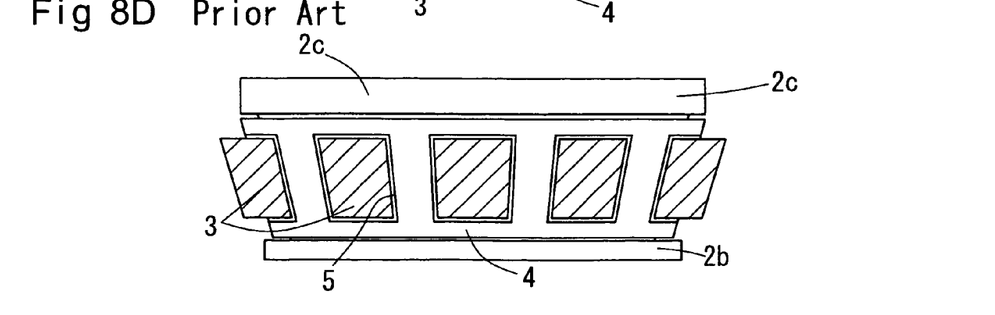
Figure 9A:
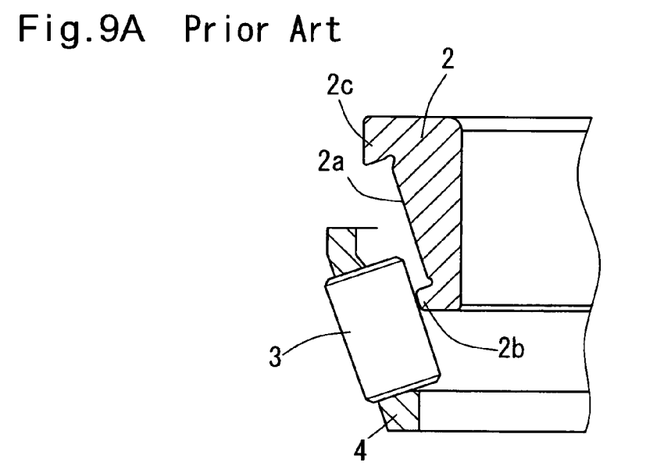
Figure 9B:
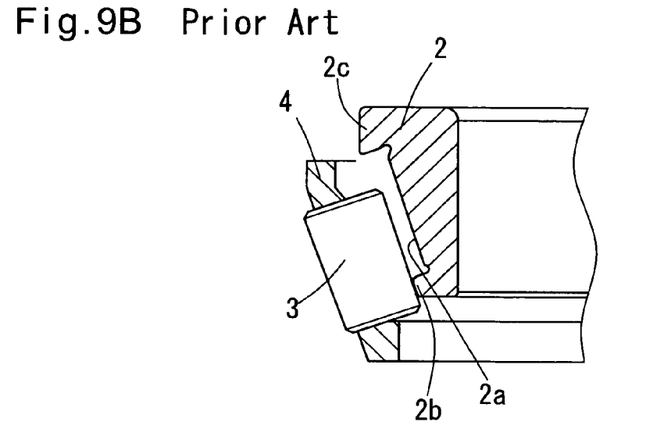
Figure 9C:
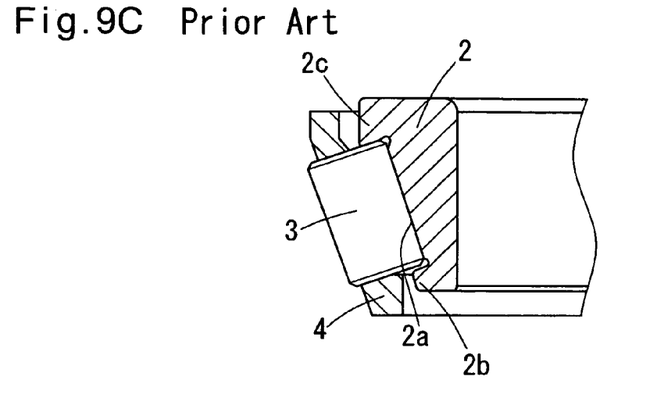
Figure 10:
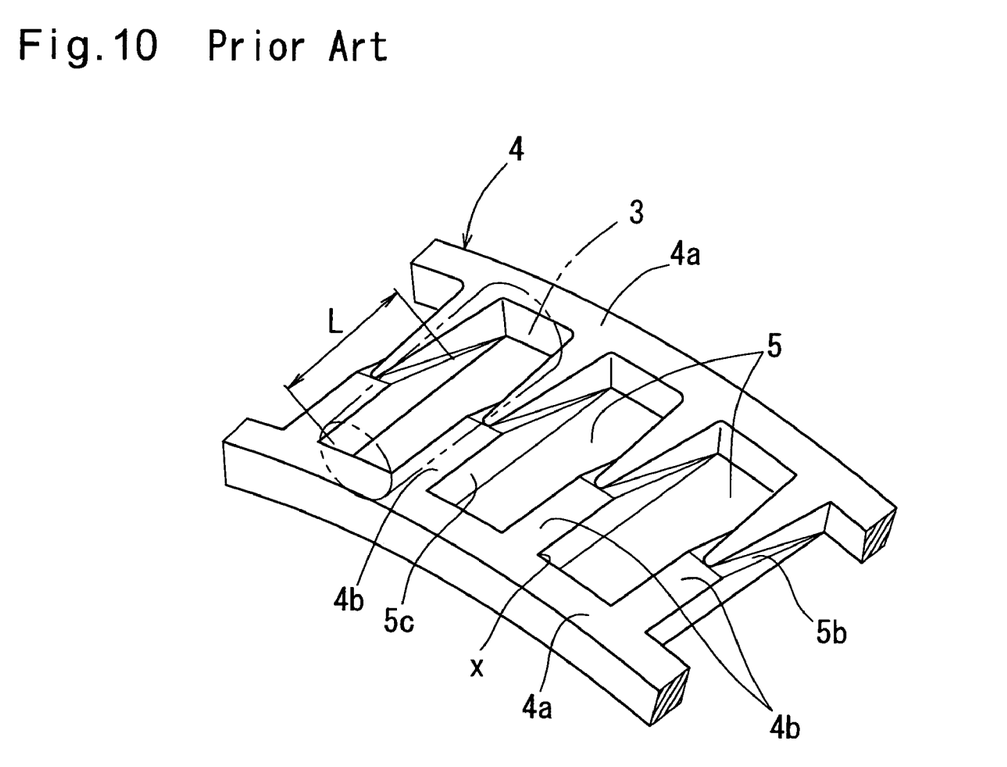
FIG. 10 is a partial perspective view of a retainer of a tapered roller bearing.

As shown in FIG. 10, the annular retainer 4 comprises two axially spaced apart annular portions 4a, and a plurality of circumferentially equidistantly spaced apart crossbars 4b that extend between the two annular portions 4a. Pockets 5 are defined by the annular portions 4a and the adjacent crossbars 4b. Each tapered roller 3 is received in one of the pockets 5 as shown in FIG. 8A. With the tapered rollers 3 received in the respective pockets 5, the inner ring 2 is inserted into the retainer 4 so that the tapered rollers 3 are supported by the inner ring 2 (as shown in FIGS. 8B to 8D and FIGS. 9A to 9C). The thus assembled inner ring 2 and the retainer 4 are inserted in the outer ring 1 to assemble the tapered roller bearing A (FIG. 7).

Such a tapered roller bearing A can be used in rotating portions of ordinary industrial machines such as automobiles, railcars, machines for manufacturing steel, machine tools and construction machines. Among such bearings A, a bearing used in a construction machine has a large diameter, so that it is difficult to ensure enough rigidity of a retainer 4, which is made of synthetic resin, for such a bearing. One possible way to increase the rigidity of the retainer 4 is to increase the thickness of the retainer 4 (i.e. the radial thickness of the crossbars 4b of the retainer).

Figure 12A:
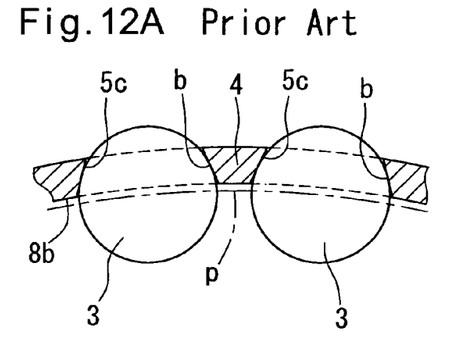
FIGS. 12A and 12B are partial sectional views of different retainers, showing their pockets.
Figure 12B:
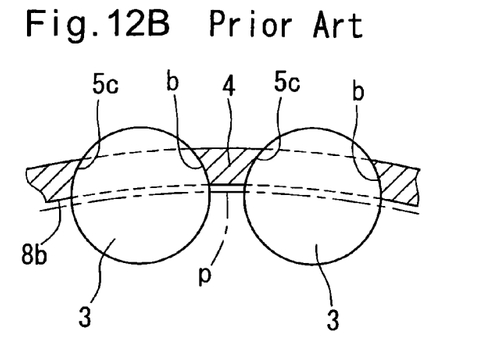

As shown in FIGS. 12A and 12B, the retainer 4 of such a tapered roller bearing A retains the tapered rollers 3 such that the tapered rollers 3 contact the crossbars 4b of the retainer 4 along lines b disposed radially outwardly of the pitch cone p of the tapered rollers 3 (conical enveloping surface defined by the axes of the tapered rollers 3) to prevent separation of any of the tapered rollers 3 from the inner ring 2 with the tapered rollers 3 held in position by the retainer 4. Thus, during operation of the tapered roller bearing A, radially outward loads are applied to the retainer 4 from the tapered rollers 3. If the thickness of the retainer is simply increased radially outwardly to increase its rigidity, the retainer 4 may interfere with the raceway of the outer ring 1. In the arrangement of FIGS. 12A and 12B, the surface 8b defined by the radially inner surfaces of the crossbars 8b is disposed radially outwardly of the pitch cone p.

Also in the arrangement of FIGS. 12A and 12B, in order to prevent separation of the tapered rollers 3 with the tapered rollers 3 supported on the inner ring 2, the maximum outer diameter $D_2$ of the small-diameter flange 2b of the inner ring 2 is determined to be larger than the diameter $d_3$ of the inscribed circle inscribed in the small-diameter end surfaces of the tapered rollers 3 with the tapered rollers 3 held by the retainer as shown in FIG. 7. (The diameter $d_3$ is equal to the minimum diameter of the conical enveloping surface defined by tangents of the inner ring raceway 2a and the tapered rollers 3, i.e. the diameter of the inner ring raceway 2a at its small-diameter end).

Thus, when the inner ring 2 is inserted into the retainer 4 with the tapered rollers 3 held by the retainer 4, the tapered rollers 3 are pushed radially outwardly by the small-diameter flange 2b before being set on the raceway 2a of the inner ring 2.

If the retainer 4 is made of iron (see JP patent publication 2003-287033A; FIG. 6), the crossbars (7 in the figures of publication 2003-287033A) of the iron retainer 4 are plastically deformed arcuately so that the diameter $d_3$ of the inscribed circle becomes larger than the maximum outer diameter of the small-diameter flange 2b. After the tapered rollers 3 are completely received in the inner ring 2, the crossbars are again plastically deformed until they become straight to prevent separation of the tapered rollers 3.

If the retainer 4 is made of synthetic resin, since such a retainer 4 is an integral member, the crossbars are elastically deformed when the inner ring 2 is inserted into the retainer 4 because the retainer is pushed by the small-diameter flange 2b through the tapered rollers 3.

The small-diameter flange 2b of the conventional inner ring 2 shown in FIG. 7 has an outer peripheral surface 6 that is parallel to the axis c of the bearing A or only slightly inclined (by an angle γ) radially outwardly toward the large-diameter portion 2c with respect to axis c. On the other hand, the angle $α_2$ of the raceway 2a of the inner ring 2 with respect to the axis c of the bearing A (central angle of the inner ring 2) is usually substantially larger than the angle γ ($α_2$>γ).

Thus, when the inner ring 2 is inserted into the retainer 4, the retainer 4 is first radially outwardly pushed by the small-diameter flange 2b through the tapered rollers 3. When the inner ring 2 is further inserted into the retainer 4, the edges of the large-diameter end surfaces of the tapered rollers 3 contact the raceway 2a because in this state, the tapered rollers 3 are supported on the outer periphery 6 of the small-diameter flange 2b and the angle $α_2$ of the raceway 2a is greater than the inclination angle γ of the outer periphery 6 of the small-diameter flange 2b. Thus, the retainer 4 is further pushed radially outwardly when the tapered rollers 3 contact the raceway 2a. In other words, the retainer 4 is pushed radially outwardly by the inner ring 2 through the tapered rollers 3 in two stages, i.e. first by the outer periphery 6 of the small-diameter flange 2b and then by the raceway 2a. This tends to prematurely deteriorate the retainer 4 of synthetic resin.

Further, in the conventional arrangement of FIG. 7, the maximum outer diameter $D_2$ of the small-diameter flange 2b is far greater than the diameter $d_3$ of the circle inscribed in the small-diameter end surfaces of the tapered rollers 3 with the tapered rollers 3 held by the retainer 4. Thus, when the inner ring 2 is inserted into the retainer 4, the small-diameter annular portion 4a of the retainer 4 is significantly deflected radially outwardly. This may result in cracks X (FIG. 10) at joint portions between the small-diameter annular portion 4a and the crossbars 4b or in the worst case, breakage of the retainer 4.

Figure 11A:
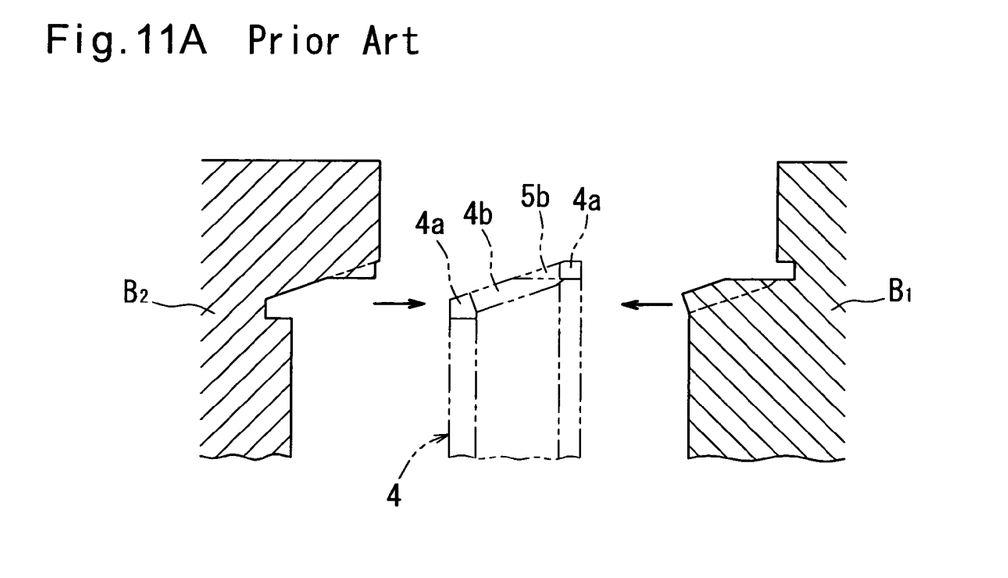
FIGS. 11A and 11B show how the retainer of FIG. 10 is formed by resin-molding.
Figure 11B:
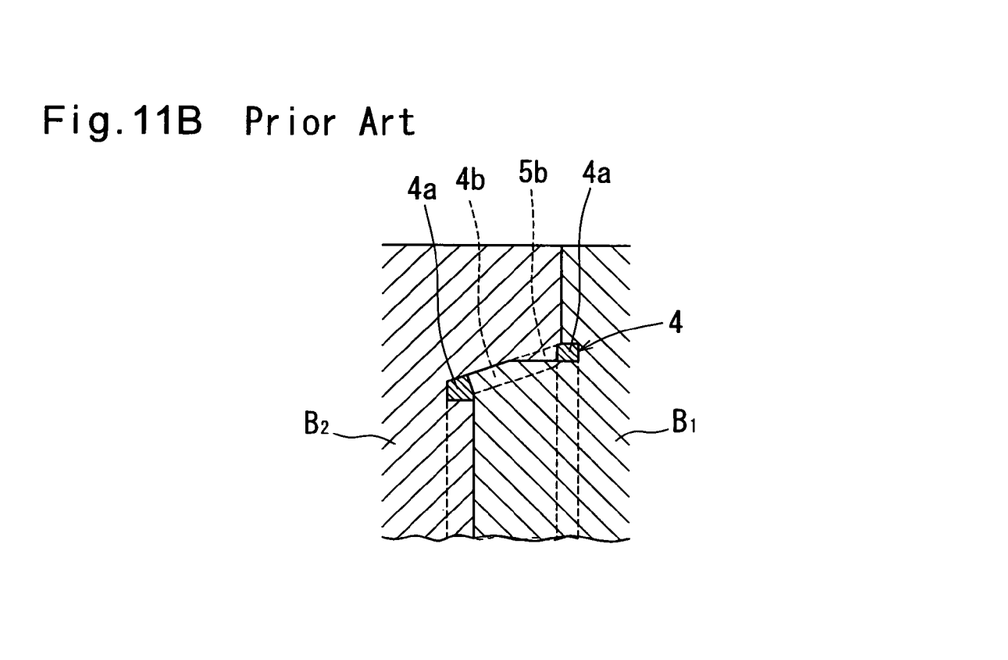

In order to reduce the manufacturing cost, as shown in FIGS. 11A and 11B, the retainer 4 of synthetic resin is ordinarily formed by injection molding using two molds $B_1$ and $B_2$ that are separable from each other in the axial direction of the bearing A. The mold $B_1$ has portions for forming the pockets 5 of the retainer and a cavity for forming the large-diameter annular portion 4a of the retainer 4. The mold $B_2$ has portions for forming cutouts 5b (see FIG. 10) in both sides 5c of each crossbar 4b so that the molds $B_1$ and $B_2$ are axially separable from each other (movable in the directions opposite to the directions shown by the arrows in FIG. 11A) after forming the retainer 4. That is, it is essential to form the cutouts 5 in order for the molds $B_1$ and $B_2$ to be axially separable from each other after forming the retainer. Also, to permit axial separation of the molds $B_1$ and $B_2$, the side surfaces 5c of the crossbars 4b are formed into flat (FIG. 12A) or arcuate (FIG. 12B) tapered surfaces.

Because the cutouts 5b are formed on the side surfaces 5c of the crossbars 4b and the side surfaces 5c of the crossbars 4b are flat or arcuate tapered surfaces, the tapered rollers 3 received in the pockets tend to be brought into line contact with the side surfaces 5c not over the entire axial length thereof but only over part of the axial length thereof, and in the worst case, the tapered rollers 3 may be brought into point contact with the side surfaces 5c.

If the length of line contact therebetween is short or if they are brought into point contact with each other, the tapered rollers 3 cannot stably rotate about the axis of the bearing. Also, the retaining force tends to concentrate on the small-diameter end of the retainer 4, which may result in cracks at joint portions X between the small-diameter annular portion 4a and crossbars 4b or breakage of the retainer 4.

SUMMARY OF THE INVENTION

A first object of the present invention is to improve the rigidity of a retainer made of synthetic resin in a tapered roller bearing. A second object of the present invention is to prevent the retainer from being subjected to stress in a plurality of stages when the inner ring is inserted into the retainer with the tapered rollers held by the retainer. A third object of the present invention is to prevent cracks in the joint portions between the annular portions and the crossbars of the retainer when the inner ring is inserted into the retainer. A fourth object of the present invention is to stabilize the rotation of the tapered rollers 4 about the axis of the bearing while preventing uneven distribution of retaining force from the retainer 4 to the tapered rollers.

According to the present invention, in order to achieve the first object, the conical surface defined by the radially inner surfaces of the crossbars is located radially inwardly of the pitch cone of the tapered rollers.

With this arrangement, the tapered rollers contact the crossbars at portions radially outwardly of the pitch cone of the tapered rollers. Also, the conical surface defined by the radially inner surfaces of the crossbars is located radially inwardly of the pitch cone of the tapered rollers. Thus, compared to a conventional arrangement in which the conical surface defined by the radially inner surfaces of the crossbars is located radially outwardly of the pitch cone of the tapered rollers, the distance between the conical surfaces defined by the radially outer surfaces and radially inner surfaces of the crossbars (i.e. the thickness of the crossbars) increases, so that the rigidity of the retainers increases.

Because the plurality of crossbars extend between the two axially spaced apart annular portions, by disposing the conical surface defined by the radially inner surfaces of the crossbars radially inwardly of the pitch cone of the tapered rollers, the axially inner surface of the small-diameter annular portion is displaced axially inwardly compared to the axially inner surface of the small-diameter annular portion of a conventional retainer. Thus, the small-diameter annular portion of the retainer according to the present invention has a larger axial thickness than that of the conventional retainer (compare FIG. 1 with FIG. 7). This further increases the rigidity of the retainer.

More specifically, according to the present invention, there is provided a tapered roller bearing comprising an outer ring, an inner ring, a plurality of tapered rollers disposed between the outer ring and the inner ring, and a retainer made of synthetic resin and disposed between the outer ring and the inner ring for retaining the tapered rollers so as to be circumferentially spaced apart from each other, the retainer comprising two axially spaced apart annular portions, and a plurality of crossbars extending between the two annular portions so as to be circumferentially spaced apart from each other, each pair of adjacent crossbars defining, in cooperation with the two annular portions, a pocket in which one of the tapered rollers is received, the crossbars having axially extending side surfaces which are in contact with the tapered rollers at portions located radially outwardly of a pitch cone of the tapered rollers to retain the tapered rollers in the respective pockets, the crossbars having radially inner surfaces that define a conical surface that is located radially inwardly of the pitch cone.

Figure 3A:
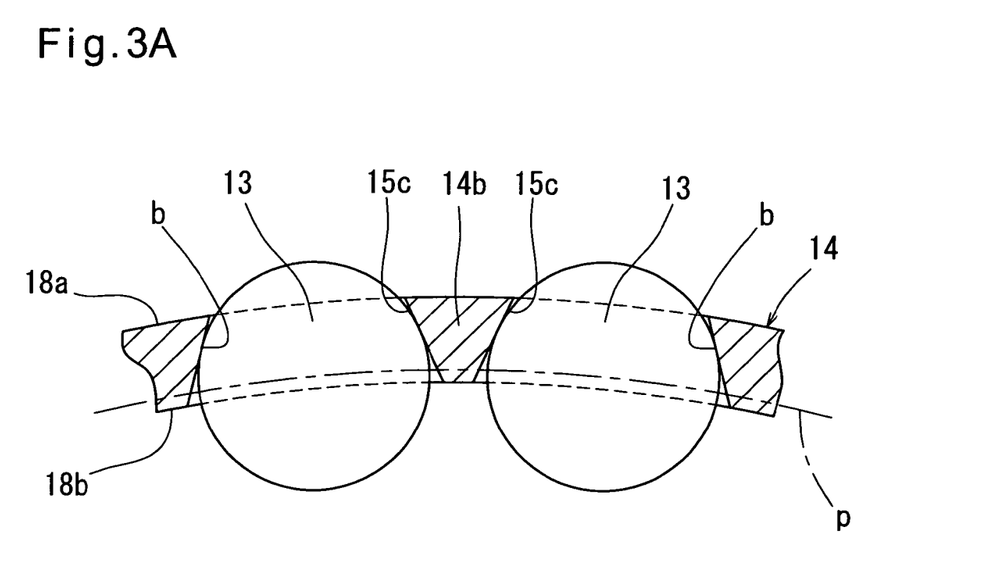
FIGS. 3A and 3B are partial sectional views of the bearing of FIG. 1, showing the relationship between its retainer and tapered rollers.
Figure 3B:
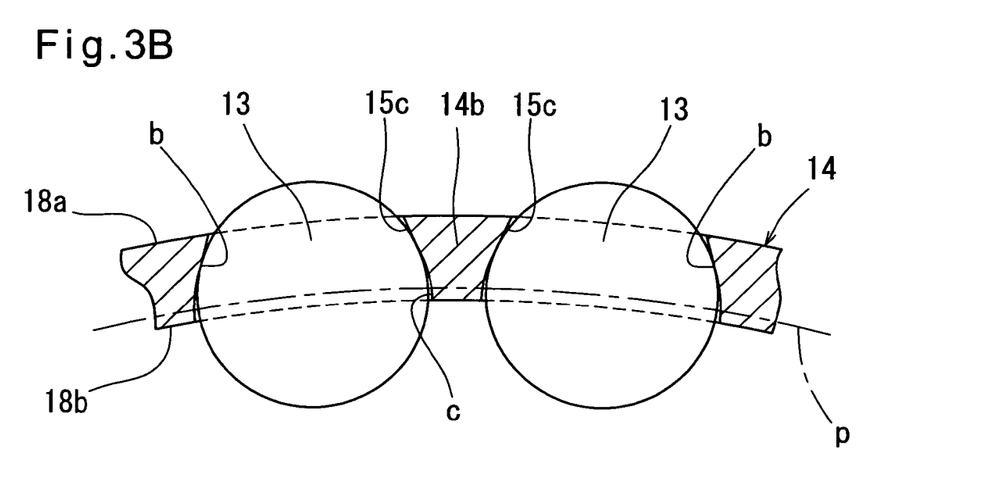

Preferably, the side surfaces of the crossbars have their radially inner portions arcuately curved (as shown in FIG. 3B) to minimize burrs.

In another arrangement for achieving the first object, the retainer is formed by two molds which are separable axially of the retainer from each other, and the crossbars have axially extending side surfaces each formed with a cutout into which one of the molds can be inserted. Also, the crossbars have radially outer surfaces defining a first conical surface and radially inner surfaces defining a second conical surface extending parallel to the first conical surface, and the first conical surface has such a maximum diameter that the retainer is barely out of contact with the outer ring. Further, an angle β (FIG. 1) between the first conical surface and an axis of the bearing is determined to be greater than a central angle of the bearing (i.e. the angle $\alpha_3$ of the pitch cone of the tapered rollers 13 in FIG. 1).

Figure 4A:
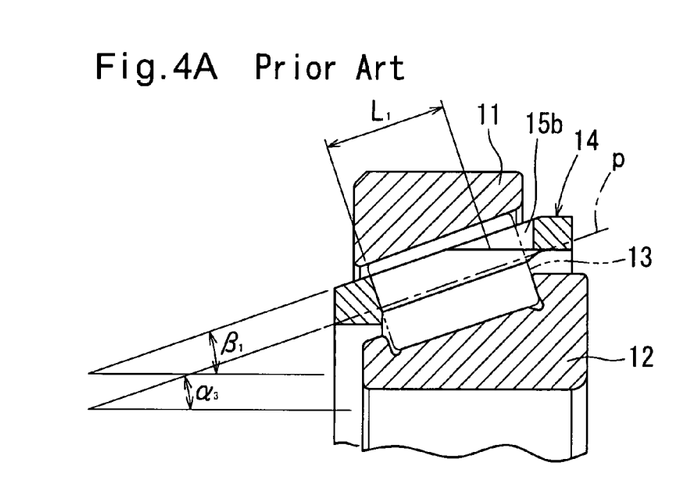
Figure 4B:
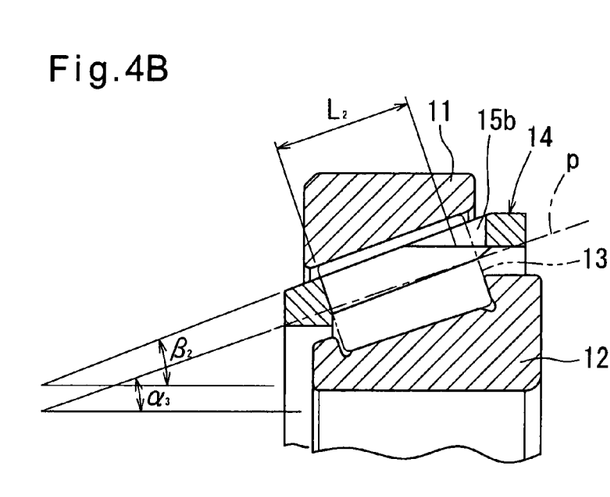
Figure 4C:
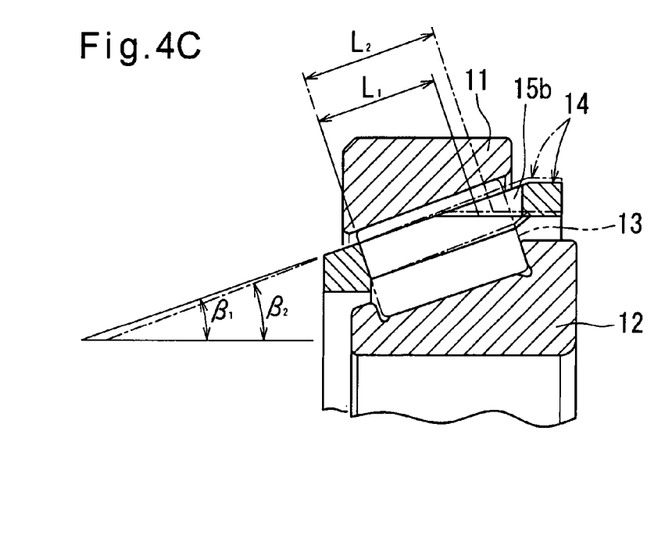

With this arrangement, as shown in FIGS. 4A to 4C, it is possible to reduce the size of the cutouts and thus increase the volume of each crossbar over its entire axial length, thereby increasing the rigidity of the retainer. The conical surface defined by the radially outer surfaces of the crossbars and the conical surface defined by the radially inner surfaces of the crossbars are preferably parallel to each other. With this arrangement, the crossbars have a uniform thickness over the entire length thereof, so that it is possible to minimize the deformation of the crossbars during resin molding.

In a specific arrangement of the present invention, there is provided a tapered roller bearing comprising an outer ring, an inner ring, a plurality of tapered rollers disposed between the outer ring and the inner ring, and a retainer made of synthetic resin and disposed between the outer ring and the inner ring for retaining the tapered rollers so as to be circumferentially spaced apart from each other, the retainer comprising two axially spaced apart annular portions, and a plurality of crossbars extending between the two annular portions so as to be circumferentially spaced apart from each other, the retainer being formed by two molds which are separable axially of the retainer from each other, each pair of adjacent crossbars defining, in cooperation with the two annular portions, a pocket in which one of the tapered rollers is received, wherein the crossbars have radially outer surfaces defining a first conical surface and radially inner surfaces defining a second conical surface extending parallel to the first conical surface, the crossbars having axially extending side surfaces each formed with a cutout into which one of the molds can be inserted, wherein the first conical surface has such a maximum diameter that the retainer is barely out of contact with the outer ring, and wherein an angle between the first conical surface and an axis of the bearing is greater than a central angle of the bearing.

The means for achieving the first objects can be used together with means for achieving any of the other objects of the invention.

In order to achieve the second object of the invention, the small-diameter flange has a radially outer inclined surface that is inclined radially outwardly toward the large-diameter flange so as to form an angle with respect to an axis of said bearing that is equal to or greater than the central angle of the inner ring.

By determining the inclination angle $\gamma$ of the radially outer surface of the small-diameter flange to be equal to or greater than the central angle $\alpha_2$ of the inner ring (inclination angle of the inner ring raceway), when the tapered rollers fit on the raceway of the inner ring after they have passed over the radially outer surface of the small-diameter flange, the retainer is not pushed radially outwardly by the inner ring raceway because the inclination angle $\alpha_2$ of the raceway is smaller than the inclination angle $\gamma$ of the radially outer surface of the small-diameter flange. This prevents the retainer from being subjected to stress in two stages, which in turn prevents reduced durability of the retainer.

As a specific arrangement for achieving the second object of the invention, there is provided a tapered roller bearing comprising an outer ring, an inner ring, a plurality of tapered rollers disposed between the outer ring and the inner ring, and a retainer made of synthetic resin and disposed between the outer ring and the inner ring for retaining the tapered rollers so as to be circumferentially spaced apart from each other, the retainer comprising two axially spaced apart annular portions, and a plurality of crossbars extending between the two annular portions so as to be circumferentially spaced apart from each other, each pair of adjacent crossbars defining, in cooperation with the two annular portions, a pocket in which one of the tapered rollers is received, wherein the inner ring is formed with a raceway and includes a small-diameter flange at a small-diameter end of the raceway and a large-diameter flange at a large-diameter end of the raceway, the small-diameter flange having a radially outer inclined surface that is inclined radially outwardly toward the large-diameter flange so as to form an angle with respect to an axis of the bearing that is equal to or greater than a central angle of the inner ring.

In order to achieve the third object of the invention, the difference between the maximum outer diameter of the small-flange portion and the diameter of the circle inscribed in the small-diameter end surfaces of the tapered rollers is determined such that the retainer of synthetic resin is free of cracks and other damage.

With this arrangement, when the inner ring is inserted into the retainer with the tapered rollers held by the retainer, it is possible to prevent joint portions between the small-diameter annular portion and the crossbars from being cracked or otherwise damaged when pushed by the small-diameter flange of the inner ring.

For example the diameter $d_3$ of the circle inscribed in the small-diameter end surfaces of the tapered rollers and the maximum outer diameter $D_2$ of the small-diameter flange are determined to satisfy the relation $0.975 \times D_2 < d_3 < 1 \times D_2$.

Although dependent upon the design of the retainer, if a retainer made of one of the below-mentioned engineering plastics is elongated (or deflected) e.g. by 1/40 of its diameter, the retainer tends to suffer cracks e.g. at joint portions X between the crossbars and the annular portions 4a (see FIG. 10). Thus, if the diameter $d_3$ is $0.975 \times D_2$ or less, the retainer tends to be stressed excessively by the small-diameter flange and suffer cracks or other damage. If the diameter $d_3$ is equal to or greater than $D_2$, the tapered rollers tend to separate from the inner ring after the inner ring has been completely inserted into the retainer.

As a specific arrangement for achieving the third embodiment, there is provided a tapered roller bearing comprising an outer ring, an inner ring, a plurality of tapered rollers disposed between the outer ring and the inner ring, and a retainer made of synthetic resin and disposed between the outer ring and the inner ring for retaining the tapered rollers so as to be circumferentially spaced apart from each other, the retainer comprising two axially spaced apart annular portions, and a plurality of crossbars extending between the two annular portions so as to be circumferentially spaced apart from each other, each pair of adjacent crossbars defining, in cooperation with the two annular portions, a pocket in which one of the tapered rollers is received, wherein the inner ring is formed with a raceway and includes a small-diameter flange at a small-diameter end of the raceway and a large-diameter flange at a large-diameter end of the raceway, and wherein a circle inscribed in small-diameter end surfaces of the tapered rollers has a diameter $d_2$ that satisfies a relation $0.975 \times D_2 < d_3 < 1 \times D_2$ relative to a maximum outer diameter $D_2$ of the small-diameter flange.

In order to achieve the fourth object, the crossbars have radially outer surfaces defining a first conical surface and radially inner surfaces defining a second conical surface extending parallel to the first conical surface, the first conical surface has such a maximum diameter that the retainer is barely out of contact with the outer ring, and an angle $\beta$ between the first conical surface and an axis of the bearing is greater than a central angle $\alpha_3$ of the bearing.

With this arrangement, the retainer is disposed close to the retainer with the cutouts 5b formed in the side surfaces of the crossbars 4b displaced radially outwardly. This increases the length L of the contact line along which the tapered rollers contact the side surfaces of the crossbars, thereby stabilizing the rotation of the tapered rollers 3 about the axis of the bearing and making it possible for the retainer 4 to evenly hold the tapered rollers 3 (as shown in FIG. 4). Since the cutouts 5b are displaced radially outwardly, the length L of the contact line L is not influenced by the existence of the cutouts 5b.

Because the retainer is disposed close to the outer ring, the gap between the outer ring and the retainer at their ends near the large-diameter flange of the inner ring is small, so that the flow of lubricant therethrough is restricted. Thus, lubricant stays in this gap for a longer period or time, allowing the bearing to be lubricated sufficiently.

Further, by forming the crossbars such that the above-defined first and second conical surfaces extend parallel to each other, the crossbars have a uniform thickness over the entire axial length thereof, so that it is possible to minimize deformation during resin molding.

As a specific arrangement for achieving the fourth object, there is provided a tapered roller bearing comprising an outer ring, an inner ring, a plurality of tapered rollers disposed between the outer ring and the inner ring, and a retainer made of synthetic resin and disposed between the outer ring and the inner ring for retaining the tapered rollers so as to be circumferentially spaced apart from each other, the retainer comprising two axially spaced apart annular portions, and a plurality of crossbars extending between the two annular portions so as to be circumferentially spaced apart from each other, each pair of adjacent crossbars defining, in cooperation with the two annular portions, a pocket in which one of the tapered rollers is received, wherein the crossbars have radially outer surfaces defining a first conical surface and radially inner surfaces defining a second conical surface extending parallel to the first conical surface, wherein the first conical surface has such a maximum diameter that the retainer is barely out of contact with the outer ring, and wherein an angle β between the first conical surface and an axis of the bearing is greater than a central angle $α_3$ of the bearing.

In this arrangement, in order to achieve the first object, the retainer may be formed by two molds which are separable axially of the retainer from each other, and the crossbars may have axially extending side surfaces each formed with a cutout into which one of the molds can be inserted.

Preferably, in any of the above-described arrangements, the edges of the small-diameter flange and the tapered rollers that are brought into contact with each other when the inner ring is inserted into the retainer with the tapered rollers retained by the retainer each comprise a rounded surface through which two flat surfaces are connected together, the rounded surface including transition portions each connected to one of the two flat surfaces and having a radius of curvature that gradually increases toward the respective flat surfaces.

With this arrangement, since each rounded surface is smoothly connected to the two flat surfaces without a sudden change in the radius of curvature, the tapered rollers can smoothly slide onto the small-diameter flange without the possibility of the retainer suffering cracks at joint portions between the annular portions and the crossbars or the breakage of the retainer.

The tapered roller bearing according to the present invention can be used for rotating portions of ordinary industrial machines including automobiles, railcars, machines for manufacturing steel, machine tools and construction machines. In particular, bearings used in construction machines have a large outer diameter of 240 mm and thus their retainers are typically made of metal.

But from an economical point of view, it is desired to use a retainer made of synthetic resin for bearings used in construction machines. But because such bearings have a large diameter, it is difficult to ensure sufficient rigidity if their retainers are made of synthetic resin. But by increasing the thicknesses of the crossbars and the small-diameter annular portion of the retainer, due to its increased rigidity, such a retainer can be used for bearings having a large diameter and a reduced wall thickness, which are typically used in rotating portions of construction machines.

Also, because such bearings have a large diameter, a correspondingly large force acts on the retainer as the tapered rollers are slid onto the small-diameter flange when the inner ring is inserted into the retainer with the tapered rollers held by the retainer. But by determining the diameter $d_3$ of the circle inscribed in the small-diameter end surfaces of the tapered rollers and the maximum outer diameter $D_2$ of the small-diameter flange so as to satisfy the abovementioned predetermined relation, it is possible to minimize the force applied to the retainer when the inner ring is inserted into the retainer, thereby increasing the durability of the retainer.

A retainer made of synthetic resin is superior in shock resistance to a retainer made of iron due to shock absorbing characteristics of resin. Further, a retainer made of synthetic resin is free of iron powder, which is produced from iron retainers and tends to detrimentally influence the characteristics of the bearing.

By determining the maximum outer diameter of the retainer such that the retainer is barely out of contact with the outer ring, and determining the central angle of the retainer so as to be greater than the central angle of the bearing, the tapered rollers can stably rotate about the axis of the bearing, and the durability of the retainer improves too. Thus, such a bearing is advantageous for use in construction machines, which are used under harsh conditions.

According to the present invention, the rigidity of the retainer improves partly because the crossbars of the retainer have an increased radial thickness and its small-diameter annular portion has an increased axial thickness.

Because the radially outer surface of the small-diameter flange has an inclination angle that is equal to or greater than the central angle of the inner ring, when the inner ring is inserted into the retainer with the tapered rollers held by the retainer, radial expanding force is applied only by the small-diameter flange and not by the raceway of the inner ring. This improves the durability of the retainer.

By determining the difference between the maximum outer diameter of the small-diameter flange and the diameter of the circle inscribed in the small-diameter end surfaces of the tapered rollers within such a range that the retainer of synthetic resin is free of cracks or breakage, it is possible to prevent cracks or breakage of the retainer when the inner ring is inserted into the retainer with the tapered rollers retained by the retainer.

Because the retainer is disposed close to the outer ring to increase the contact length between the tapered rollers and the side surfaces of the crossbars of the retainer, the tapered rollers can stably rotate about the axis of the bearing, and the tapered rollers can be uniformly retained by the retainer. This prevents cracks at joint portions between the annular portions and the crossbars of the retainer, and thus breakage of the retainer.

BRIEF DESCRIPTION OF THE DRAWINGS

Other features and objects of the present invention will become apparent from the following description made with reference to the accompanying drawings, in which:

FIGS. 4A to 4C compare the functions of the bearing of FIG. 1 and a conventional bearing;

DETAILED DESCRIPTION OF THE PREFERRED EMBODIMENTS

Figure 1:
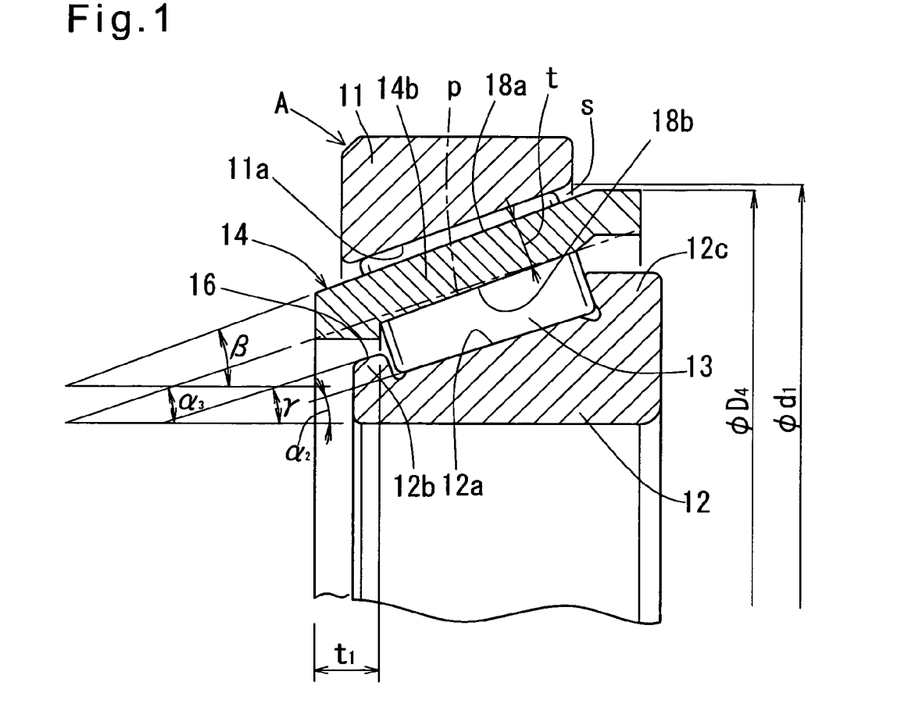
FIG. 1 is a partial sectional view of a tapered roller bearing embodying the present invention.
Figure 2:
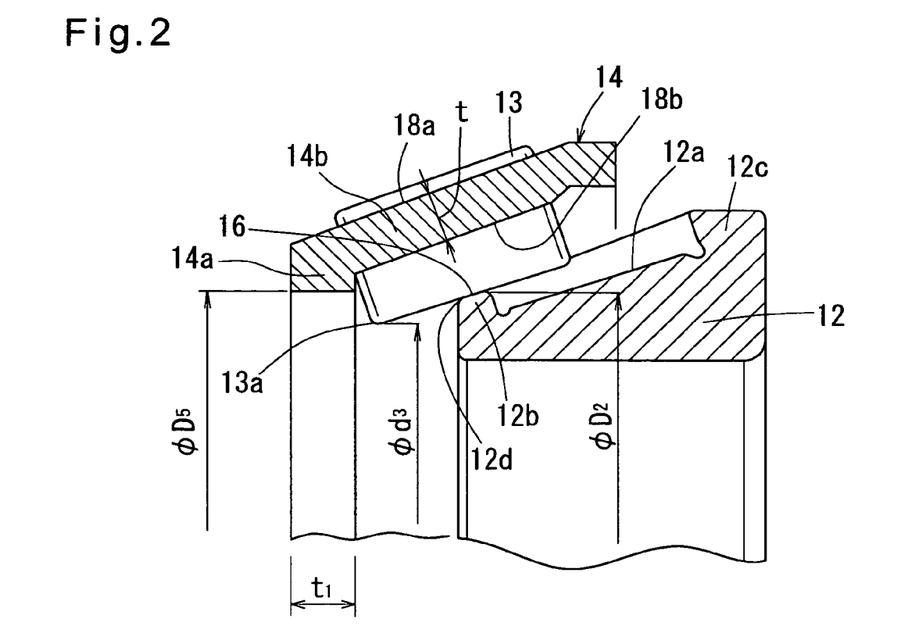
FIG. 2 shows how the bearing of FIG. 1 is assembled.

Now referring to FIGS. 1 to 5, the tapered roller bearing A embodying the present invention is used in a rotating portion of the travel speed reducing sprocket S of the hydraulic excavator shown in FIG. 13 around which the crawler C is trained, and comprises, as shown in FIGS. 1 and 2, an outer ring 11, an inner ring 12, and a plurality of tapered rollers 13 disposed between the inner and outer rings 12 and 11. The tapered rollers 13 are spaced apart from each other at predetermined intervals in the circumferential direction by a retainer 14 made of synthetic resin and disposed between the outer ring 11 and the inner ring 12. The inner ring 12 is formed with a raceway 12a for the rollers 13 and includes a small-diameter flange 12b at the small-diameter end of the raceway 12a and a large-diameter flange 12c at the large-diameter end of the raceway 12a.

Figure 5:
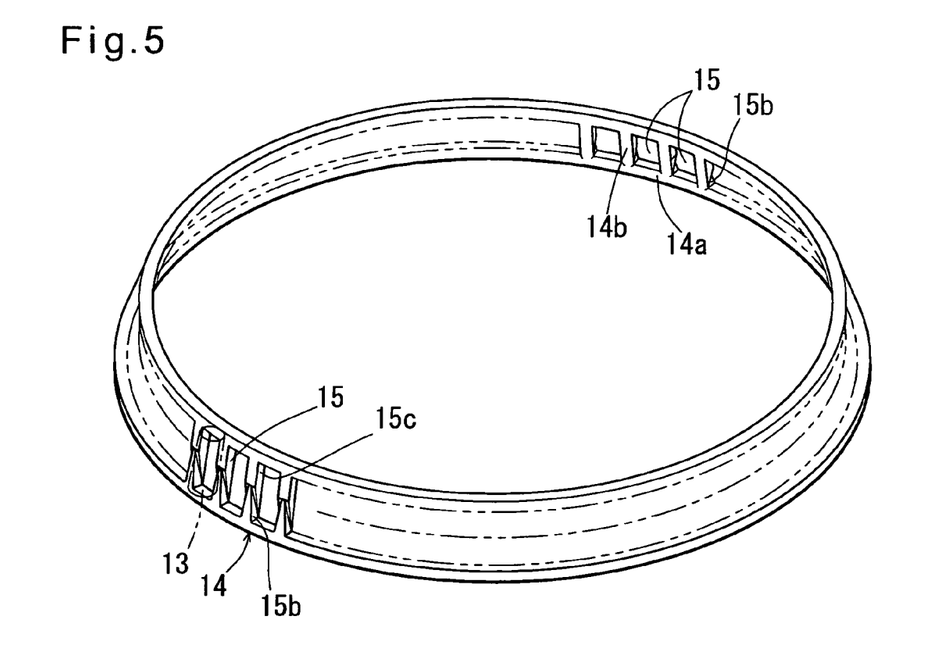
FIG. 5 is a partially omitted perspective view of the retainer of the bearing of FIG. 1.

As shown in FIG. 5, the retainer 14 comprises two axially spaced apart annular portions 14a and a plurality of circumferentially equidistantly spaced crossbars 14b axially extending between the two annular portions 14a. Pockets 15 are defined axially by the annular portions 14a and circumferentially by the adjacent crossbars 14b. Each tapered roller 13 is received in one of the pockets 15. The tapered rollers 13 are thus kept circumferentially equidistantly spaced apart from each other when the rollers 13 roll between the outer ring 11 and the inner ring 12.

The diameter $d_3$ of the circle inscribed in the small-diameter end surfaces of the tapered rollers 13 is determined to satisfy the relation:

$$0.975 \times D_2 < d_3 < 1 \times D_2$$

where $D_2$ is the maximum outer diameter of the small-diameter flange 12b of the inner ring 12. In the embodiment, $D_2$ is 207.5 mm and $d_3$ is 204.7 mm.

With this arrangement, it is possible to protect the retainer 14, which is made of synthetic resin, from cracks and other damage when the inner ring 12 is inserted into the retainer 14 with the tapered rollers 13 retained by the retainer 14.

The small-diameter flange 12b has a radially outer inclined surface 16 inclined radially outwardly toward the large-diameter flange 12c at an angle γ with respect to the central axis c (see FIG. 7) of the bearing A. The angle γ is equal to or larger than the central angle $\alpha_2$ of the inner ring 12 (inclination angle of the raceway 12a of the inner ring).

With this arrangement, when the inner ring 12 is inserted into the retainer 14 of synthetic resin with the tapered rollers 13 retained by the retainer 14, the retainer is radially expanded only by the small-diameter flange 12b of the inner ring 12 and not by its raceway 12a. This increases the durability of the retainer.

The axially and radially outer edge 12d of the small-diameter flange 12b and the edges 13a of the small-diameter and large-diameter end surfaces of the tapered rollers each comprise a rounded surface through which two flat surfaces are connected together (see FIG. 2). The rounded surface comprises a central portion, and transition portions each provided between the central portion and one of the two flat surfaces and having a radius of curvature that gradually increases from the central portion toward the respective flat surfaces.

With this arrangement, since each rounded edge is smoothly connected to the two flat surfaces without a sudden change in the radius of curvature, the tapered rollers 13 can smoothly slide onto the small-diameter flange 12b without the possibility of the retainer suffering cracks at joint portions between the annular portions 14a and the crossbars 14b or the breakage of the retainer 14 when the inner ring 12 is inserted (as shown in FIG. 2) into the retainer 14 with the tapered rollers 13 retained by the retainer 14.

With the tapered rollers 13 held by the retainer 14, the tapered rollers 13 contact the crossbars 14b along lines b that are located radially outwardly of the pitch cone p of the tapered rollers 13 (i.e. conical enveloping surface defined by the axes of the tapered rollers 13), and the conical surface 18b defined by the radially inner surfaces of the crossbars 14b is located radially inwardly of the pitch cone p. With this arrangement, the crossbars 14b of the retainer 14 have a thickness t that is greater than the thickness $t_2$ of the crossbars 4b of the conventional retainer 4 shown in FIG. 7.

Because the conical surface 18b defined by the radially inner surfaces of the crossbars of the retainer 14 is located radially inwardly of the pitch cone p of the tapered rollers 13, compared to conventional retainers, the axially inner surface of the small-diameter annular portion 14a is located axially inward. Thus, the small-diameter annular portion 14a has an increased axial thickness $t_1$ (FIG. 2).

Since the crossbars 14b have the increased radial thickness t and the small-diameter portion 14a has the increased axial thickness $t_1$, the rigidity of the retainer 14 is high.

If the crossbars 14b have an increased thickness t as described above, and further the side surfaces 15c of the crossbars 14b are straight surfaces as shown in FIG. 3A, burrs tend to be produced. Thus, preferably, in order to minimize burrs, the side surfaces 15 have their radially inner portions arcuately curved as shown at c in FIG. 3B so as to smoothly contact the tapered rollers 13.

The conical surface 18a defined by the radially outer surfaces of the crossbars 14b of the retainer 14 is parallel to the conical surface 18b defined by the radially inner surfaces of the crossbars 14b. This means that the crossbars 14b are uniform in radial thickness over the entire axial length thereof. The maximum outer diameter $D_4$ of the conical surface 18a is determined such that the retainer is barely out of contact with the outer ring 11, and the inclination angle β of the conical surface 18a is determined to be greater than the central angle $\alpha_3$ of the bearing A (see FIG. 1).

The retainer 14 of this embodiment is manufactured by injection-molding of a resin in two molds which are separable from each other in the axial direction of the bearing A as shown in FIGS. 11A and 11B. For smooth axial separation of the molds $B_1$ and $B_2$, a cutout 15b is formed in each of the side surfaces of the crossbars 14b.

As shown in FIG. 4B, the conical surface defined by the radially outer surfaces of the crossbars 14b has an inclination angle $\beta_2$ that is greater than the central angle $\alpha_3$ of the bearing A. With this arrangement, compared to a conventional arrangement of FIG. 4A, in which the conical surface defined by the radially outer surfaces of the crossbars 14b has an inclination angle $\beta_1$ that is equal to the central angle $\alpha_3$, it is possible to reduce the size of the cutouts 15b, and thus to increase the volume of the crossbars 14b, which in turn results in increased rigidity of the retainer 14. Also, as shown in FIG. 4C, the contact length L between the tapered rollers 13 and the side surfaces of the crossbars 14b increases ($L_1 < L_2$).

This stabilizes the rotation of the tapered rollers about the axis of the bearing and also, and makes it possible for the retainer 14 to more uniformly retain the tapered rollers 13. This in turn eliminates stress concentration on joint portions X between the crossbars 14b and the annular portions 14a, thus minimizing the possibility of cracks at the joint portions X or breakage of the retainer.

If there were not the cutouts 15b, the contact length L would be equal to the axial length of the tapered rollers even if the conical surface defined by the radially outer surfaces of the crossbars has an inclination angle $\beta_1$ that is equal to the central angle $\alpha_3$ of the bearing A as shown in FIG. 4A. But if the conical surface defined by the radially outer surfaces of the crossbars has an inclination angle $\beta_2$ that is sufficiently greater than the central angle $\alpha_3$ of the bearing A as shown in FIG. 4B, the contact length L is always equal to the axial length of the tapered rollers irrespective of whether the cutout 15b are formed or not.

The retainer is made of engineering plastics, which may be either general purpose engineering plastics or super engineering plastics. General purpose engineering plastics usable in this invention include polycarbonate (PC), polyamide 6 (PA 6), polyamide 66 (PA 66), polyacetal (POM), modified polyphenylene ether (m-PPE), polybutylene terephthalate (PBT), glass fiber-reinforced polyethylene terephthalate (GF-PET), and ultra-high molecular weight polyethylene (UHMW-PE).

Super engineering plastics usable in this invention include polysulfone (PSF), polyethersulfone (PES), polyphenylene sulfide (PPS), polyarylate (PAR), polyamide-imide (PAI), polyetherimide (PEI), polyetheretherketone (PEEK), liquid crystal polymer (LCP), thermoplastic polyimide (TPI), polybenzimidazole (PBI), polymethylpentene (TPX), poly-1,4-cyclohexanedimethylene terephthalate (PCT), polyamide 46 (PA 46), polyamide 6T (PA6T), polyamide 9T (PA9T), polyamide 11, 12 (PA 11, 12), fluorine-containing synthetic resin and polyphthalamide (PPA).

The retainer 14 of the embodiment is made of polyamide 66.

Figure 6:
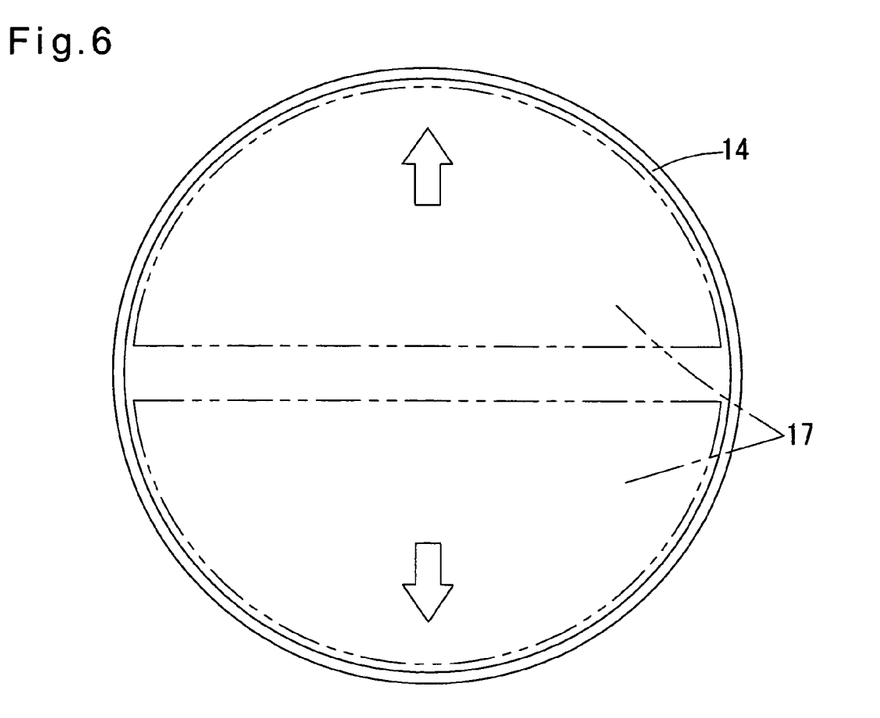
FIG. 6 shows how the retainer of the bearing of FIG. 1 is tested for its strength.

As shown in FIG. 6, the retainer 14 was fitted on the outer periphery of a pair of semicircular jigs 17 (shown by chain lines in FIG. 6) and the semicircular jigs 17 were moved in opposite directions to each other (as shown by two arrows in FIG. 6) until the retainer 14 was broken to test its tensile strength. In this test, when the semicircular jigs 17 separated from each other by a distance of 5.7 mm (i.e. when the minimum diameter $D_5$ (=210.2 mm; see FIG. 7) of the retainer 14 increased by 5.7 mm), the retainer 14 broke. Thus, the retainer 14 was proved to have enough tensile strength.

It was possible to assemble the bearing A as shown in FIGS. 8A to 8D, and FIGS. 9A to 9C without encountering any problems.

The tapered roller bearing of the embodiment has all of the following five features:

(1) The tapered rollers 13 are retained in the respective pockets 15 of the retainer 14 so as to contact the side surfaces of the crossbars 14b along line b that is located radially outwardly of the pitch cone p of the tapered rollers 13. The conical surface 18b defined by the radially inner surfaces of the crossbars 14b is located radially inwardly of the pitch cone p of the tapered rollers.

(2) The retainer 14 has such a maximum outer diameter $D_4$ that the retainer is barely out of contact with the outer ring 11 at its end facing the large-diameter flange 12c ($D_4$<maximum inner diameter $d_1$ of the outer ring). The radially outer surface of the retainer 14 has an inclination angle $\beta$ that is greater than the central angle $\alpha_3$ of the bearing A ($\beta > \alpha_3$).

(3) The diameter $d_3$ of the circle inscribed in the small-diameter end surfaces of the tapered rollers 13 and the maximum outer diameter $D_2$ of the small-diameter flange 12b are determined to satisfy the relation $0.975 \times D_2 < d_3 < 1 \times D_2$.

(4) The small-diameter flange 12b has a radially outer inclined surface 16 that are inclined radially outwardly toward the large-diameter flange 12c at an angle $\gamma$ with respect to the central axis of the bearing A, the angle $\gamma$ being equal to or greater than the central angle $\alpha_2$ of the inner ring 12 ($\gamma \geq \alpha_2$).

(5) The axially and radially outer edge 12d of the small-diameter flange 12b and the edges 13a of the small-diameter and large-diameter end surfaces of the tapered rollers each comprise a rounded surface through which two flat surfaces are connected together. The rounded surface includes transition portions each connected to one of the two flat surfaces and having a radius of curvature that gradually increases toward the respective flat surfaces. However, the tapered roller bearing according to the present invention may have not all of these five features but only one or some of these five features.

The tapered roller bearing A of the embodiment is used in a rotating portion of the travel speed reducing sprocket S around which the crawler C of the hydraulic excavator shown in FIG. 13 is trained. But the tapered roller bearing according to the present invention is also usable in rotating portions of other machines and devices including automobiles, railcars, machines for manufacturing steel and machine tools.

What is claimed is:

1. A tapered roller bearing comprising an outer ring, an inner ring, a plurality of tapered rollers disposed between said outer ring and said inner ring, and a retainer made of an engineering plastic and disposed between said outer ring and said inner ring for retaining said tapered rollers so as to be circumferentially spaced apart from each other, said retainer comprising two axially spaced apart annular portions, and a plurality of crossbars extending between said two annular portions so as to be circumferentially spaced apart from each other, each pair of adjacent crossbars defining, in cooperation with said two annular portions, a pocket in which one of said tapered rollers is received, wherein said crossbars have radially outer surfaces defining a first conical surface and radially inner surfaces defining a second conical surface extending parallel to said first conical surface, wherein said first conical surface has a maximum diameter such that said retainer is adjacent to but out of contact with said outer ring, wherein an angle between said first conical surface and an axis of the bearing is greater than a central angle of the bearing, said central angle of the bearing being constituted by an angle of a pitch cone of said tapered rollers with respect to the axis of the bearing, wherein said inner ring is formed with a raceway and includes a small-diameter flange at a small-diameter end of said raceway and a large-diameter flange at a large-diameter end of said raceway, wherein said small-diameter flange has a radially outer inclined surface that is inclined radially outwardly toward said large-diameter flange so as to form an angle with respect to the axis of said bearing that is equal to or greater than a central angle of said inner ring, said central angle of said inner ring being constituted by an inclination angle of said raceway of said inner ring with respect to the axis of the bearing, wherein a circle inscribed in small-diameter end surfaces of said tapered rollers has a diameter $d_3$ that satisfies a relation $0.975 \times D_2 < d_3 < 1 \times D_2$ relative to a maximum outer diameter $D_2$ of said small-diameter flange, and wherein said crossbars have axially extending side surfaces each formed with a cutout configured such that one of a pair of molds, which are configured to form said retainer and to be separated from each other in a direction axially of said retainer, can be inserted therein.

* * * * *